(12) United States Patent
Murphy

(10) Patent No.: US 9,247,272 B2
(45) Date of Patent: Jan. 26, 2016

(54) NETWORK OF COLLABORATIVE ONLINE SHOWS

(71) Applicant: Timothy Murphy, Gaithersburg, MD (US)

(72) Inventor: Timothy Murphy, Gaithersburg, MD (US)

( * ) Notice: Subject to any disclaimer, the term of this patent is extended or adjusted under 35 U.S.C. 154(b) by 129 days.

(21) Appl. No.: 13/627,048

(22) Filed: Sep. 26, 2012

(65) Prior Publication Data

US 2013/0091220 A1    Apr. 11, 2013

Related U.S. Application Data

(60) Provisional application No. 61/543,762, filed on Oct. 5, 2011, provisional application No. 61/649,894, filed on May 21, 2012.

(51) Int. Cl.
| G06F 15/16 | (2006.01) |
| H04N 21/2187 | (2011.01) |
| G06Q 30/00 | (2012.01) |
| G06Q 50/00 | (2012.01) |
| H04N 21/4788 | (2011.01) |

(52) U.S. Cl.
CPC ........... *H04N 21/2187* (2013.01); *G06Q 30/00* (2013.01); *G06Q 50/01* (2013.01); *H04N 21/4788* (2013.01)

(58) Field of Classification Search
USPC ................................ 709/203–206, 217, 227
See application file for complete search history.

(56) References Cited

U.S. PATENT DOCUMENTS

| 7,539,632 | B1 * | 5/2009 | Chakrabarti et al. ........ 705/26.1 |
| 7,653,640 | B2 * | 1/2010 | Khosravy et al. .......... 707/999.1 |
| 8,510,380 | B2 * | 8/2013 | Faller et al. .................... 709/204 |
| 2006/0004597 | A1 * | 1/2006 | Charters et al. .................. 705/1 |
| 2008/0098313 | A1 * | 4/2008 | Pollack .......................... 715/753 |
| 2008/0222295 | A1 * | 9/2008 | Robinson et al. ............. 709/227 |
| 2009/0009605 | A1 * | 1/2009 | Ortiz ............................. 348/157 |
| 2009/0164034 | A1 * | 6/2009 | Cohen et al. ..................... 700/94 |
| 2009/0249451 | A1 * | 10/2009 | Su et al. ........................... 726/5 |
| 2011/0010384 | A1 * | 1/2011 | Luo et al. ....................... 707/769 |
| 2011/0150198 | A1 * | 6/2011 | Walsh et al. ............. 379/202.01 |
| 2011/0302216 | A1 * | 12/2011 | D'Angelo et al. ............. 707/802 |
| 2012/0221740 | A1 * | 8/2012 | Arsenio ......................... 709/231 |
| 2013/0046826 | A1 * | 2/2013 | Stanton ......................... 709/204 |

* cited by examiner

*Primary Examiner* — Liangche A Wang
*Assistant Examiner* — Melaku Habtemariam
(74) *Attorney, Agent, or Firm* — James M. Smedley LLC; James Michael Smedley, Esq.

(57) ABSTRACT

The present invention generally relates to networked communication systems. In particular, embodiments of the invention are directed to systems and methods configured to provide an audience centric instant micro forum for sharing media and communications regarding a particular event and/or product.

9 Claims, 6 Drawing Sheets

NETWORK OF COLLABORATIVE ONLINE SHOWS

CROSS REFERENCE TO RELATED APPLICATIONS

This application claims the benefit of U.S. Provisional Patent Application No. 61/543,762 filed Oct. 5, 2011, the entire disclosure of which is incorporated herein by reference.

This application claims the benefit of U.S. Provisional Patent Application No. 61/649,894 filed May 21, 2012, the entire disclosure of which is incorporated herein by reference.

FIELD OF THE INVENTION

The present invention generally relates to networked communication systems. In particular, embodiments of the invention are directed to systems and methods configured to provide an audience centric instant micro forum for sharing media and communications regarding a particular show, event and/or product.

BACKGROUND

Use of social networking systems is ubiquitous. In today's socially networked society, there are no shortages of user centric systems designed to connect two or more individuals in order to provide those individuals the ability to share content between them and their other friends/acquaintances.

One limitation with social networking systems currently available is that they are almost all limited to connecting user A with user B and potentially identify additional users to user A based on other connections possessed by user B. In the alternative, presently available social networking systems are configured to allow user A to be connected to a group B which is comprised of a multitude of users that may share some interest or other characteristic. No social networking systems are currently available that connect users based on an event, show or product.

For example, when a user attends an event currently, the user may be able to send messages, photos or videos to other users via one or more social networking services. The problem is that this information is fragmented and not gathered or collectively associated with the event. So hundreds or thousands of individual users at an event may be sharing content, but that content is not available collectively to those hundreds or thousands of individuals.

Because of this limitation in content aggregation and association, it is impossible to record, display and curate an event or show as a collective entity. Further, since content sharing is disjointed, communication amongst and to those individuals present at an event (i.e., the audience) can be impossible or otherwise inefficient.

Given the lack of abilities with current social network services to aggregate and associate content amongst individuals associated with an event, show or product, not only is there a lack of an ability to effectively communicate with these individuals, but there is also a lack of the ability to preserve the content associated with the event in any meaningful manner (e.g., a multimedia journal).

Therefore, there is need in the art for a computing platform and network with a system and method configured to provide an audience centric instant micro forum for sharing media and communications regarding a particular event and/or product. These and other features and advantages of the present invention will be explained and will become obvious to one skilled in the art through the summary of the invention that follows.

SUMMARY OF THE INVENTION

Accordingly, it is an aspect of the present invention to provide an audience centric instant micro forum for sharing media and communications regarding a particular show, event and/or product.

According to an embodiment of the present invention, a web-based system for providing an audience centric instant micro forum for sharing media and communications, includes: a multimedia gathering module comprising computer-executable code stored in non-volatile memory; a control module comprising computer-executable code stored in non-volatile memory; a communications means; and a processor, wherein said multimedia gathering module, said control module, said communications means and said processor are operably connected; and wherein said multimedia gathering module, said control module, said communications means and said processor are configured to collectively: receive multimedia content from one or more users; control at least a portion of said multimedia content based on one or more commands received at said control module to form a first content; transmit said first content to one or more screens; and display said first content on said one or more screens.

According to an embodiment of the present invention, each of said one or more screens is either a group screen for one or more users or a personal computing screen.

According to an embodiment of the present invention, the system further includes a local social cluster, comprising one or more computing devices and a local social cluster control module, wherein said local social cluster is collectively configured to: receive local multimedia content from one or more local users; control at least a portion of said local multimedia content based on one or more commands received at said local social cluster control module; transmit said local content to said communications means.

According to an embodiment of the present invention, the local content is joined with said first content to form a collective content.

According to an embodiment of the present invention, the collective content is transmitted to said one or more display screens and displayed on one or more of said one or more display screens.

According to an embodiment of the present invention, the display of said first content is controlled by said control module.

According to an embodiment of the present invention, the control module is controlled at least in part by commands received from said local social control module.

According to an embodiment of the present invention, the multimedia content comprises one or more of the group comprising audio, images, video and textual information.

According to an embodiment of the present invention, a web-based method for providing an audience centric instant micro forum for sharing media and communications includes the steps of: receiving multimedia content from one or more users; controlling at least a portion of said multimedia content based on one or more commands received at a control module to form a first content; transmitting said first content to one or more group screens; and displaying said first content on said one or more group screens.

According to an embodiment of the present invention, the method may further include the steps of: transmitting said first content to one or more personal computing screens; and displaying said first content on said one or more personal computing screens.

According to an embodiment of the present invention, the method may further include the steps of: receiving local multimedia content from one or more local users at a local social cluster, comprising one or more computing devices and a local social cluster control module; controlling at least a portion of said local multimedia content based on one or more commands received at said local social cluster control module; transmitting said local content to a communications means.

According to an embodiment of the present invention, two or more said audience centric instant micro forums are connected to form an expanded social network.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to networked communication systems. In particular, embodiments of the invention are directed to systems and methods configured to provide an audience centric instant micro forum for sharing media and communications regarding a particular show, event and/or product.

Figure 1:
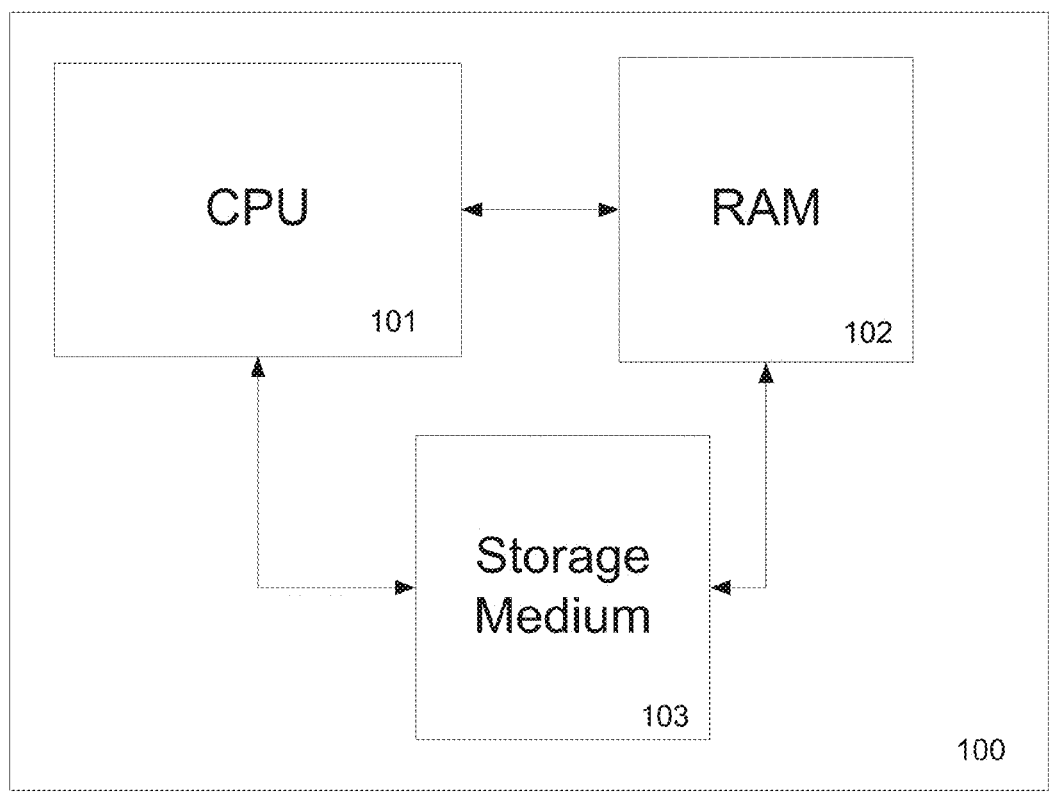
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network; however a user may be able to compose data offline that will be consumed by the system when the user is later connected to a network.

Figure 2:
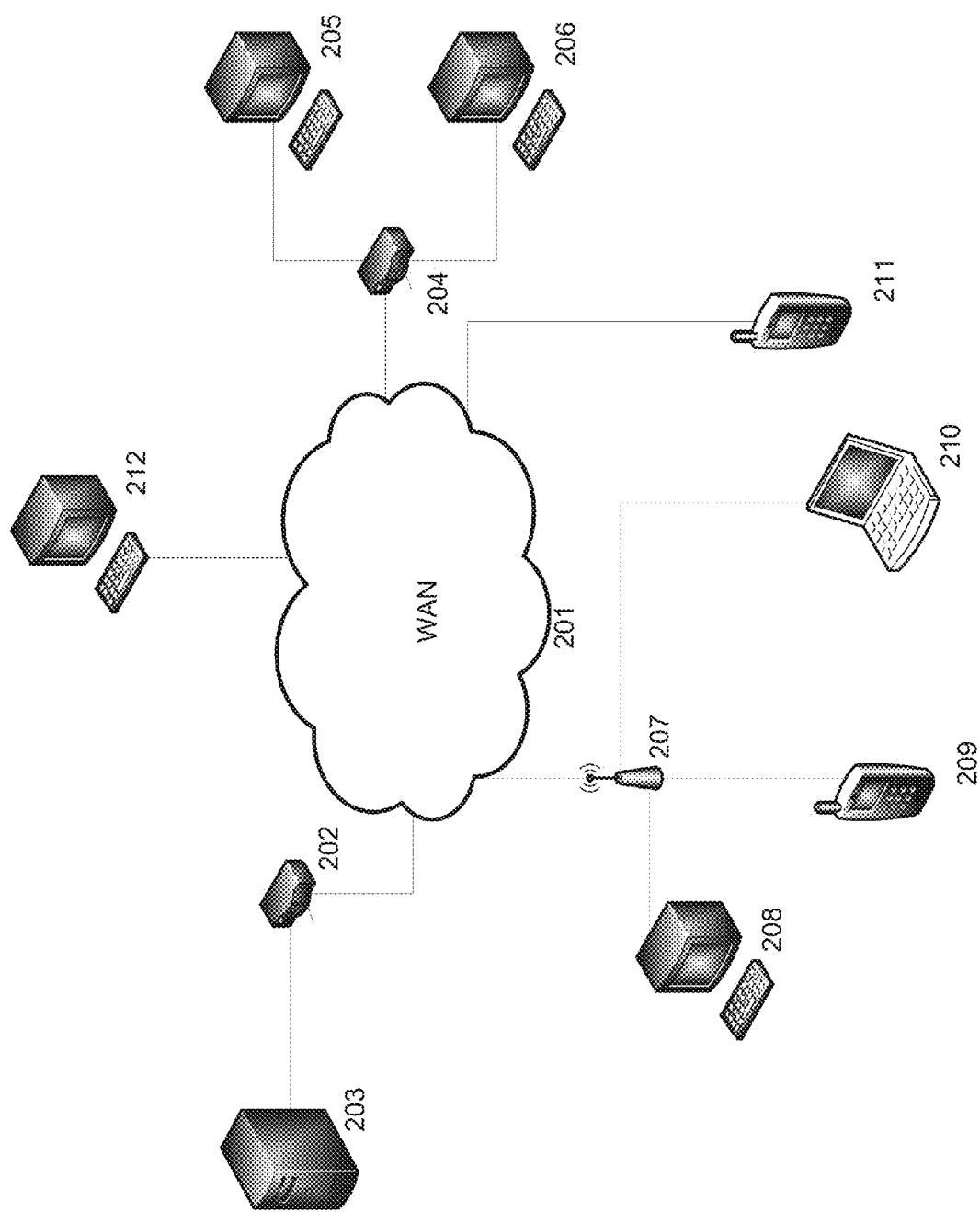
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, a system and method for providing an audience centric instant micro forum for sharing media and communications regarding a particular show, event and/or product is provided. Embodiments of the present invention are configured to provide micro forums or other social networking constructs for gathering and curating multimedia content (e.g., audio, images, video, text) based on an association (e.g., attendance at an event).

For the purposes of this application, the term event may refer to an occasion, date, location or any combination thereof. Generally events are posted or provided to the system by a user and spans some finite length of time. Events can also be sourced from other databases via an application programming interface (API). For each event, the system may be configured to generate an online interactive multimedia show. A show may be a place where multiple users provide content to and one or more directors/controllers/moderators are able to command and/or control various events, displays and/or other characteristics of the show. In alternative embodiments, shows may be controlled automatically by the system, with content selected and displayed on one or more display screens depending on configurations present and associated with the automated control systems.

In certain embodiments, shows may be associated with an event. In other embodiments, shows may be generated and moderated by a vendor or other merchant. Vendor shows are used, in exemplary embodiments, to showcase a vendor's products or services. Vendor shows are generally controlled by a moderator associated with the vendor, however the system may be automatically configured to moderate a vendor show, including the automated removal of offensive or derogatory content provided by users that the vendor would not want associated with the vendor, or its goods and/or services.

In still further embodiments, shows may be associated with topics (e.g., areas of interest). Non-event topics may include, but are not limited to, art, movies, celebrities, music, exercise, educational topics or any combination thereof. One of ordinary skill in the art would appreciate that there are numerous topics that could be utilized with embodiments of the present invention, and embodiments of the present invention are contemplated for use with any topic. In topic based shows, like vendor shows, a moderator may be associated with the show in order to control and direct the processing and display of content received from participants and provided by the producer of the show as well.

According to an embodiment of the present invention, shows of any type may be made private, public or semi-private/semi-public. Various levels of permissions may be granted based on the type of show. For instance, public shows may be made truly open, whereby any user may view and/or post content (provided control, processing and curation of content are not restricted by the producer). Other public shows may be available for any user to join, but there may be explicit moderators/administrators who have control over how content is processed and displayed. This may be the case with private and/or semi-private/semi-public shows as well, with the show having the ability to allow anyone to moderate, particular individuals moderate, have the show fully moderated by automatic processing controlled by the system, or any combination thereof. It should be apparent that there may be one or more moderators for any given show, including configurations whereby each moderator has a separate or overlapping set of permissions and abilities to control processing and display of content.

Figure 2B:
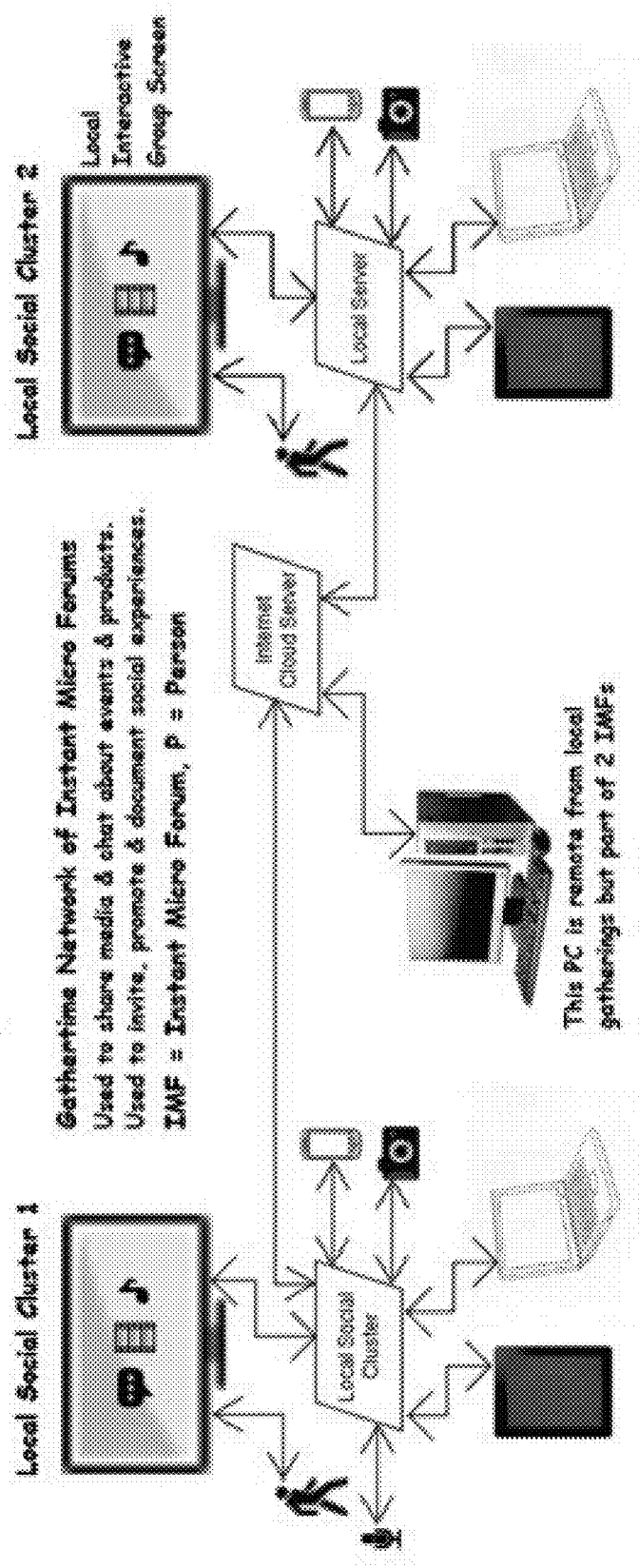
FIG. 2B illustrates a network schematic of a system, in accordance with an embodiment of the present invention.

Turning now to FIG. 2B, a schematic overview of a system in accordance with an embodiment of the present invention is shown. In this schematic, two local social clusters are shown connected to a computing device via the Internet. Content provided to each local social cluster (i.e., instant micro forum) can be by participants in the local social cluster (e.g., attendees of the event/show) or by those remote from the local social cluster (e.g., users viewing the event/show on a remote computing device). In practice, in certain embodiments, local social clusters can be formed without any system hardware being present at the particular location of the local social cluster. Receipt, processing, transmission and display of content to and from a local social cluster and the devices thereof can be handled by remote computing components/devices (e.g., remote application servers). In other embodiments, one or more local computing components/devices may be used to handle these operations entirely or in conjunction with remote computing components/devices.

Figure 3:
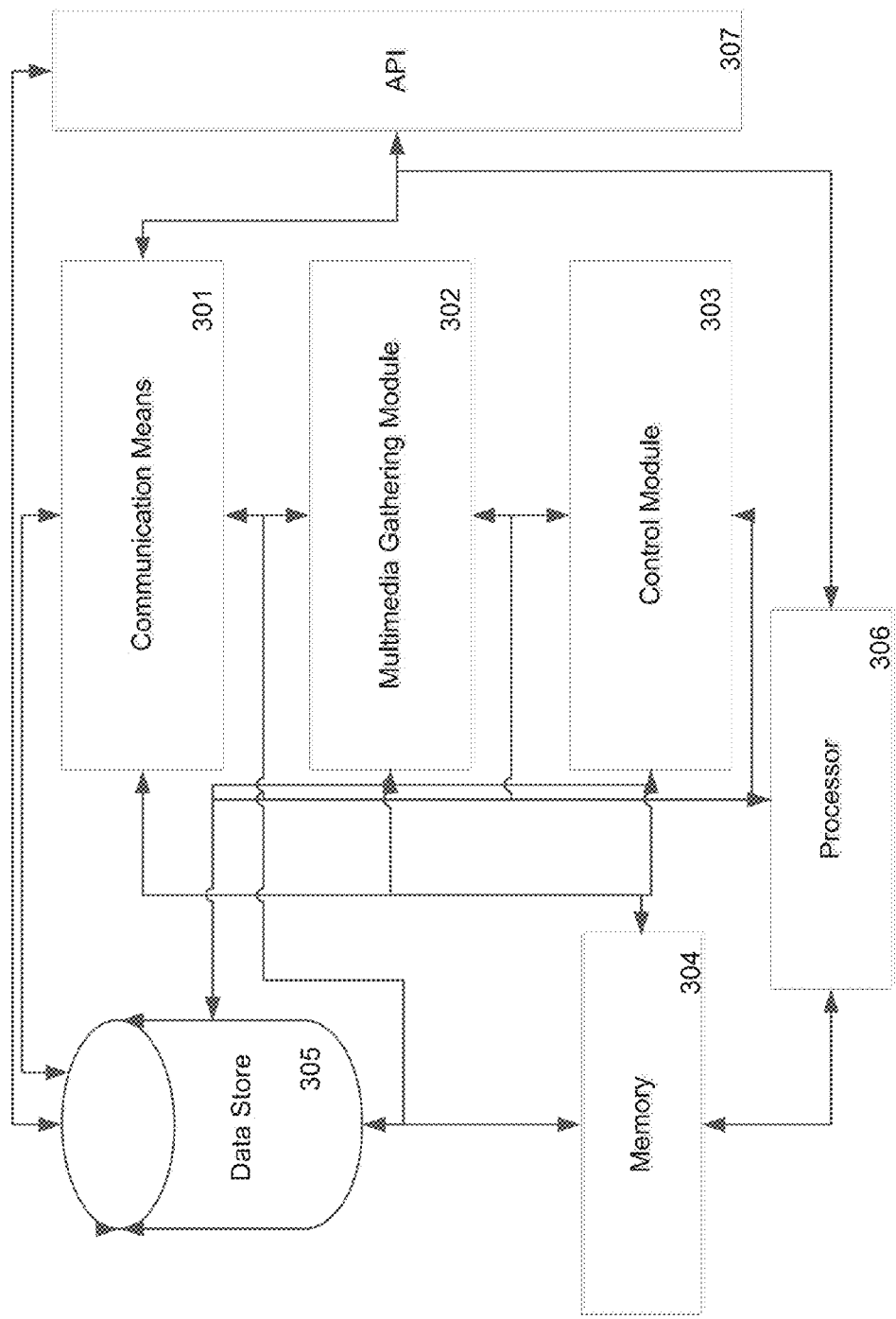
FIG. 3 is a schematic of a system for providing an audience centric instant micro forum for sharing media and communications regarding a particular event and/or product, in accordance with an embodiment of the present invention.

Turning now to FIG. 3, an exemplary embodiment of a system for providing audience centric instant micro forums for sharing media and communications regarding a particular event and/or product is shown. In this embodiment, the system includes a communications means 301, a multimedia gathering module 302, a control module 303, a non-transitory memory module 304, a data store 305, a processor 306 and an application programming interface (API) 307. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the multimedia gathering module may be comprised of computer-executable code stored in non-transitory memory for use in conjunction with a processor in order to instruct a computer or other computing device to perform actions as described herein. The multimedia gathering module may be further configured to work in conjunction with the communications means (and other connections thereto, such as through APIs or other communications methods) in order to communicate with one or more users. The multimedia gathering module is configured to allow one or more users to connect to the system and provide content associated with one or more shows. The multimedia gathering module may be further configured to process the received content, store the received content in one or more digital storage mediums (e.g., databases, memory, storage mediums, physical media etc.) and transmit the content to one or more displays.

According to an embodiment of the present invention, the command module may be comprised of computer-executable code stored in non-transitory memory for use in conjunction with a processor in order to instruct a computer or other computing device to perform actions as described herein. The command module is configured to control, moderation and curation commands to one or more moderators/directors/administrators (collectively referred to as "moderators"). The command module may further provide access, privilege and authorization commands to the one or more moderators. In total, the command module allows one or more moderators the ability to control and administer the functionality of the system when the system is not being fully automated.

Examples of commands provided by the command module include content selection, display selection, display format, display permission settings, show permission settings, show start settings, show stop settings, user administration, moderator administration, automated display settings, automated content processing settings and archival/journal settings. One of ordinary skill in the art would appreciate there are numerous commands that may be provided by the command module in conjunction with embodiments of the present invention and embodiments of the present invention are contemplated for use with command modules configured with any type of commands.

In a preferred embodiment, the command module is accessible to one or more moderators either through a local access means (e.g., human interface device attached to a local computing device) or through the communication means. The command module is preferably operably connected to the multimedia gathering module and is configured to issue commands to and enact control over the multimedia gathering module. One of ordinary skill in the art would appreciate there are numerous configurations that could be utilized with embodiments of the present invention, and embodiments of the present invention are contemplated for use with any configuration.

According to an embodiment of the present invention, during a show, the command module, as operated by the system or moderator(s), works in conjunction with the multimedia gathering module to gather multimedia content, curate the content into a desired format and transmit the content to one or more display screens. Display screens may be local or remote from the system. Local display screens may include displays, monitors, televisions, projectors and/or other display devices attached directly to the system (e.g., HDMI cable, DVI cable, VGA cable, component connector). Remote display screens may include, but are not limited to, the display screens of the computing devices of the one or more users of the system. Content transmitted to the local display screens may be identical or may be varied from the content transmitted to the remote display screens. In certain embodiments, content may vary from display screen to display screen based on one or more criteria identified by the command module (e.g., user access privileges, user age, display screen type, display screen selection). In certain embodiments, group screen(s) and private screen(s) may be synchronized to focus the audience attention to the same content. In certain embodiments, synchronized and or desynchronized screens may be used to play various games.

Figure 4:
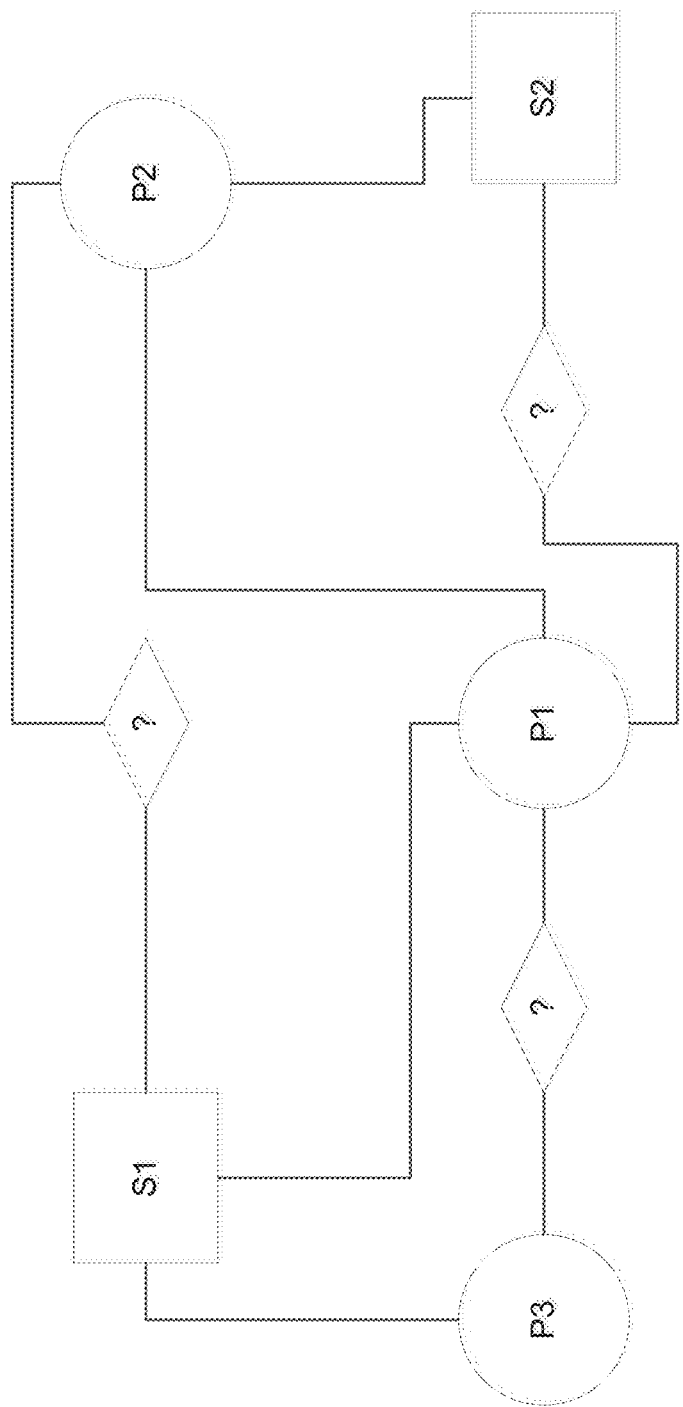
FIG. 4 is an illustration of an exemplary embodiment of an expanded social network connection mapping between audience centric instant micro forums and their users in accordance with an embodiment of the present invention.

Turning now to FIG. 4, an exemplary expanded social network connection diagram is shown. This diagram illustrates a network of known and un-known connections (?'s), between users (P1, P2, P3) and audience centric instant micro forum shows (S1, S2). Unknown shows and users are discovered via known shows and/or known users. For example, the user P1 can discover the show (S2) via a known acquaintance (P2). The user P1 can also discover individuals (P3) outside his social circle via a mutually followed show (S1). Previous profile centric networks cannot efficiently find folks with common interest outside of their member's social circle. The present invention enhances each member's ability to widen their social circle. The present invention may cross post or mirror content to other third party profile centric social networks. This further expands a member's ability to grow their social circle. One of ordinary skill in the art would understand, an audience centric instant micro forum is an ad hoc type of social network and it would be obvious and advantageous to connect multiple micro forums to expand this network and to provide additional functionality and or benefits, including but not limited to: a searchable database of users connected to said micro forums; improved discovery of products and events through association to other products, events and their users (i.e. followers, invitees, participants etc.); add promotional value by increasing traffic (i.e. number of views) to events and products (e.g. networks connect many users, thus the expanded user base increases the potential number of views); find or recommend relevant or interesting micro forums by querying the network with the user's preferred criteria; send invitations to likeminded or targeted users of micro forums; help users share and store a variety of micro forums. This illustration demonstrates the power of an audience centric social network/micro-forum (i.e., instant microforum)/show.

According to an embodiment of the present invention, the system may provide users the ability to post content in a method which imitates the style/design of a third-party social network. This provides users the ability to interact with the system through an interface they may be more comfortable or familiar with. Each post will be transmitted to the system for processing by a multimedia gathering module. In certain embodiments, the content of the post may also be delivered for posting on the third-party social network. A short URL, identifier or other link may be added to each third-party social network post for quick navigation from the third-party social network back to system. The system may be configured to aggregate these posts and display an icon on each post indicating source.

According to an embodiment of the present invention, the system may provide a user the ability to post to multiple third-party social networks at once.

According to an embodiment of the present invention, before an event/show, the system may provide users the ability to plan, share, invite, and promote the event/show. For example, users can chat about an upcoming concert, or post photos for a yard sale. During an event, the system connects people at the venue to those not physically present. Computing devices are synched via the system's communication means which assists with the receipt and transmission of the aggregated content. In certain embodiments, an optional display screen (e.g., HDTV or projector) may be used at the event/show to gather eyeballs and interact with those that do not have a computing device connected to the system. In this manner, content is not only displayed to users of the system, but attendees at the event/show may see the content on a publicly viewable display screen, hear content through the PA; and watch the online/offline audience react.

Business Benefits

According to an embodiment of the present invention, social marketing is essential and businesses need better tools. Businesses need an easy way to chat and share media, target and control their audience, and get useful feedback. This information is vital for planning and improving sales. The system provides tools to help businesses gain complete control by restricting who may post/transmit/receive content. Specials can be broadcast at the appropriate time to the appropriate clientele. Customers see products, services and events via display screens at their venue (store, club etc.) and on the web through their personal computing devices.

According to an embodiment of the present invention, the system provides controls to allow the moderators to start a dialog with the users (multi-way broadcast), or block them and push a monolog (one-way broadcast). The system further provides the ability to publish multiple events/product shows simultaneously. For instance, the system may provide the ability to have a public multi-way product show and a second private event show for a limited viewing public (e.g., VIP show).

The system may be further configured to collect and aggregate group content. It is show centric; present, future & historically orientated. Community contributed content is primarily used to plan, produce and share events and products. The system helps users make multimedia journals, chat with audiences, see what others are doing, and make friends along the way.

Third-Party Social Network Interaction

According to an embodiment of the present invention, the system may be configured to allow consumption of third-party social network content for use in the content aggregated and presented on the system. This may be accomplished, for instance, by generating a unique ID for each show/event. Anytime that unique ID is used on a third-party social network, the system will identify that unique ID as posted on the third-party social network and consume, store and process that content (e.g., events consumed through Twitter with unique hash tag IDs associated with a show/event).

According to an embodiment of the present invention, the system may be configured to employ a variety of methods to control spam or other malicious content from third-party social networks where the unique IDs are being used. Methods include, but are not limited to, blocking individual posts via moderator commands through the command module, blocking posters and all their posts via moderator commands through the command module, verified member only content processing (i.e., system users first authenticated on the system and associated with their third-party social network accounts), limited access posting, limit the duration of unique IDs or any combination thereof. One of ordinary skill in the art would appreciate there are numerous methods for reducing or eliminating malicious use of a unique ID, and embodiments of the present invention are contemplated for use with any method for limiting or reducing the malicious use of a unique ID.

Exemplary Embodiments

Figure 5:
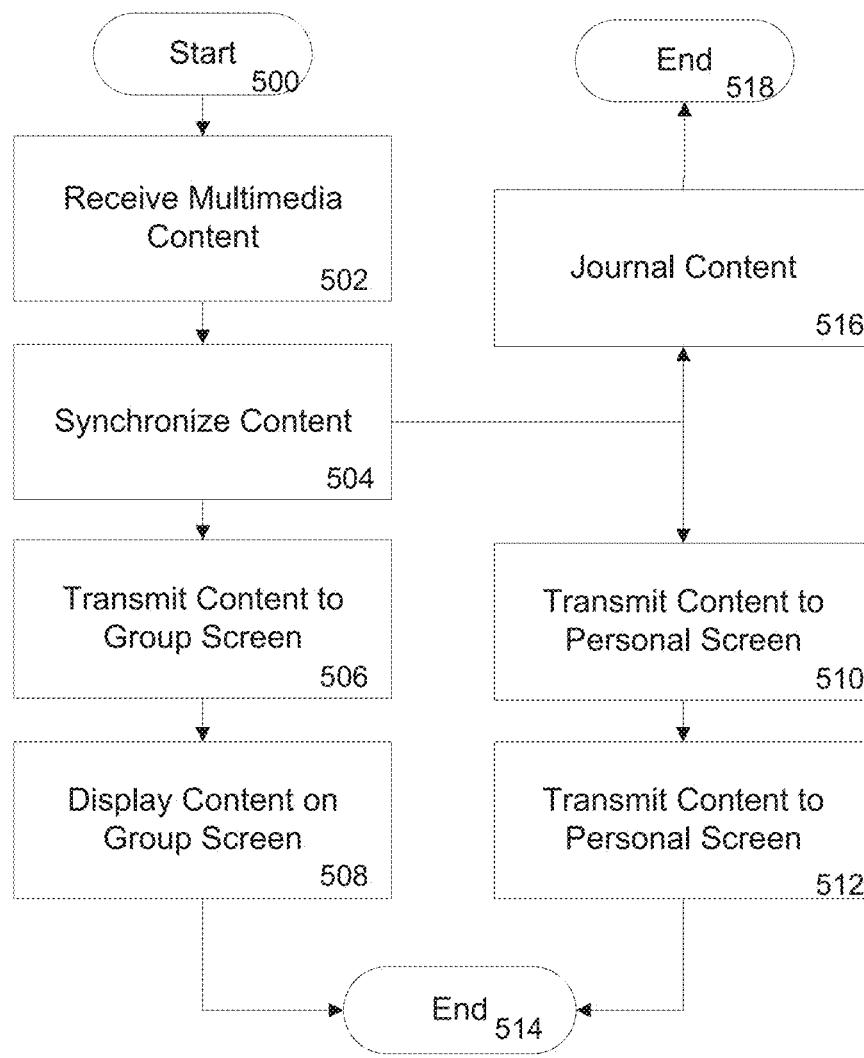
FIG. 5 is a flowchart of an exemplary method in accordance with an embodiment of the present invention.

The following is an exemplary embodiment of a method for providing an audience centric instant micro forum for sharing media and communications regarding a particular show, event and/or product, as shown in FIG. 5. At step 500, the process starts with one or more users connecting to the system to initiate or host a collaborative online show provided by the system. Users of the system may also include one or more moderators with the ability to control certain aspects of the system, generally through issuing commands to be received and processed by the command module. During this step, users of the system may invite moderators, guests, and promote the show to a public search engine provided by the system. At this stage the host may add content. At this stage the system may automatically post or generate content such as maps and images stored in the system or third party database(s). For example, the system may search database(s) for images associated with the location of the event and then post this content to the show.

At step 502, the system begins to receive content of one or more types from the one or more users connected to the system. In general, users will connect to the system via one or more means provided by the connection means. The system receiving the content may begin to process the content at this point.

At step 504, the system processes and synchronizes the content received from the one or more users of the system. Processing may include, but is not limited to identifying the type of content, length of content, provider of the content, appropriateness of the content, whether the content is from a special user (e.g., moderator, director), sorting content, storing content and journaling content for later redistribution or replay. At the end of the synchronizing process, one or more streams of content are produced which may be appropriate for display on one or more types of display screen. Streams of content may include multiple types of content from multiple sources. In certain embodiments, the system may be configured to produce a different stream of content for each type of display setup to receive content from the system (e.g., one stream for tablet PCs, one stream for smartphones, one stream for large public displays at an event, one or more streams for local computing devices and one or more separate streams for remote computing devices). One of ordinary skill in the art would appreciate that there are numerous types of streams that could be created by the system, and embodiments of the present invention are contemplated for use with any type of stream.

At step 506, the system transmits the final synchronized stream of content to one or more group screens (e.g., a large display at the event). At step 508, the one or more group screens display the received stream of content to the viewing public.

At step 510, the system transmits the final synchronized stream(s) of content to one or more personal screens (e.g., smartphone of a user, tablet PC of a user). At step 512, the one or more personal screens display the received stream of content to the user of the personal screen.

At step 514, the process terminates.

Optional step 516 provides for the storage and journaling of one or more synchronized content streams from an event, allowing for later playback or other consumption of said one or more synchronized content stream. After the journaling process is completed, the method terminates at step 518.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, DNA computer or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, holographic memory, glass memory (rearrange the atoms in pieces of glass, information can be written, wiped and rewritten into the molecular structure of the glass using a laser), or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, PHP, Python, Ruby on Rails, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A web-based system for providing audience centric instant micro forums for sharing media and communications, the system comprising:
a multimedia gathering module comprising computer-executable code stored in non-volatile memory;
a control module comprising computer-executable code stored in non-volatile memory;
a communications means; and
a processor,
wherein said multimedia gathering module, said control module, said communications means and said processor are operably connected; and
wherein said multimedia gathering module, said control module, said communications means and said processor are configured to collectively:
receive commands from one or more users to form said audience centric instant micro forum;
generate said micro forum comprising a local social cluster of a plurality of local computing devices, wherein a plurality of said micro forums define a network of micro forums;
receive multimedia content from one or more participants in said micro forum, wherein said content is associated with a past, present, or future event, product, show, or topic,
wherein said content includes photos, audio, video, and text information,
wherein said control module is configured to vary content from display screen to display screen in said micro forum based on at least one of: user access privileges, user age, display screen type, and display screen selection;
aggregate said content into a first content based on said association, wherein said first content is presented to an audience by said web-based system, and said web-based system is further configured to present multiple events, products, shows, or topics simultaneously,
wherein aspects of presentation of said multimedia content received from said micro forum participants are controlled by a designated moderator, wherein control of said multimedia content presentation is accomplished by said moderator issuing one or more commands to said control module for processing, wherein said commands include content selection, display selection, display format, display permission settings, show permission settings, show start settings, show stop settings, user administration, moderator administration, automated display settings, automated content processing settings, and archival journal settings,
wherein content posted on a third-party social network can be automatically captured by the system for use in said first content when a unique identifier associated with said event, product, topic, or show is posted on the third-party social network;
transmit said first content to one or more screens; and
display said first content on said one or more screens,
wherein said system includes controls that allow the moderator to start an interactive dialog (multi-way broadcast), or a monolog (one-way broadcast) with the micro forum participants,
wherein participants can chat, post messages, photos, or other content in said instant micro forum,
wherein an event, product, show, or topic associated with a particular user can be discovered by other users of the system who are acquainted with said user,
wherein users can discover other users of the system outside his/her social circle when said other users follow the same event, product, topic or show followed by said user.

2. The web-based system of claim 1, wherein each of said one or more screens is either a group display screen for one or more users in said micro forum, or a personal computing display screen in said micro forum.

3. The web-based system of claim 1, further comprising a local social cluster control module, wherein said local social cluster control module is configured to:
receive local commands from one or more users to form said audience centric instant micro forum;
receive local multimedia content from one or more local participants;
control at least a portion of said local multimedia content based on one or more commands received at said local social cluster control module;
transmit said local multimedia content to said communications means.

4. The web-based system of claim 1, wherein said control of said multimedia content includes one or more of:
synchronizing said multimedia content;
aggregating said multimedia content;
editing said multimedia content;
adjusting display times of said multimedia content;
setting public, semi-private and private privacy levels of said multimedia content; and
moderating said multimedia content.

5. A web-based method for providing audience centric instant micro forums for sharing media and communications, the method comprising the steps of:

forming said audience centric instant micro forum based on one or more commands received at a control module from one or more users;

receiving multimedia content from one or more participants in said micro forum, wherein said content is associated with a past, present, or future event, product, show, or topic;

aggregating said content into a first content based on said association, wherein said first content is presented to an audience by said web-based system, and said web-based system is further configured to present multiple events, products, shows, or topics simultaneously, wherein aspects of presentation of said multimedia content received from said micro forum participants are controlled by a designated moderator;

controlling at least a portion of said multimedia content based on one or more commands received from said moderator at said control module to help form said first content, wherein said commands include content selection, display selection, display format, display permission settings, show permission settings, show start settings, show stop settings, user administration, moderator administration, automated display settings, automated content processing settings, and archival journal settings;

automatically capturing content posted on a third-party social network for use in said first content when a unique identifier associated with event, product, topic, or show is posted on the third-party social network;

transmitting said first content to one or more local screens; and displaying said first content on said one or more local screens, wherein participants can chat, post messages, photos, or other content in said micro forum, starting an interactive dialog (multi-way broadcast), or a monolog (one-way broadcast) with the micro forum participants in response to controls activated by said moderator;

wherein an event, product, show, or topic associated with a particular user can be discovered by other users of the system who are acquainted with the user, wherein users can discover other users of the system outside his/her social circle when said other users follow the same event, product, topic, or show followed by said user.

6. The web-based method of claim 5, wherein each of said one or more screens is either a group display screen in said micro forum, or a personal computing display screen in said micro forum.

7. The web-based method of claim 5, further comprising the steps of:

receiving local multimedia content from one or more local participants at a local social cluster comprising a plurality of local computing devices and a local social cluster control module;

controlling at least a portion of said local multimedia content based on one or more commands received at said local social cluster control module;

transmitting said local multimedia content to a communications means.

8. The web-based method of claim 5, wherein two or more said audience centric instant micro forums are connected to form an expanded social network.

9. The web-based method of claim 5, wherein controlling of said multimedia content includes one or more of:

synchronizing said multimedia content;

aggregating said multimedia content;

editing said multimedia content;

adjusting display times of said multimedia content;

setting public, semi-private and private privacy levels of said multimedia content; and moderating said multimedia content.

\* \* \* \* \*